(12) United States Patent
Ogake (10) Patent No.: US 9,186,747 B2
(45) Date of Patent: Nov. 17, 2015

(54) SPOT WELDING APPARATUS

(75) Inventor: Noriaki Ogake, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 252 days.

(21) Appl. No.: 13/553,748

(22) Filed: Jul. 19, 2012

(65) Prior Publication Data

US 2013/0037528 A1 Feb. 14, 2013

(30) Foreign Application Priority Data

Aug. 9, 2011 (JP) .................................. 2011-173687

(51) Int. Cl.
| | |
|---|---|
| B23K 9/00 | (2006.01) |
| B23K 9/32 | (2006.01) |
| B23K 11/00 | (2006.01) |
| B23K 11/11 | (2006.01) |
| B23K 11/36 | (2006.01) |

(52) U.S. Cl.
CPC ............ *B23K 11/0033* (2013.01); *B23K 11/115* (2013.01); *B23K 11/36* (2013.01)

(58) Field of Classification Search
CPC ........ B23K 11/10; B23K 11/11; B23K 11/31; B23K 11/312; B23K 11/314; B23K 11/318; B23K 11/115
USPC .......... 219/161, 158, 127, 78.01, 86.1, 86.25, 219/86.33, 86.41, 86.61, 91.23, 91.2
See application file for complete search history.

(56) References Cited

U.S. PATENT DOCUMENTS

| | | | | | |
|---|---|---|---|---|---|
| 1,672,702 | A | * | 6/1928 | Weed | ........................... 219/86.1 |
| 2,980,788 | A | * | 4/1961 | Hunter et al. | ................... 219/89 |
| 3,215,811 | A | * | 11/1965 | Kroy et al. | .................... 219/120 |
| 4,845,333 | A | * | 7/1989 | Hidata | ....................... 219/117.1 |
| 5,866,868 | A | * | 2/1999 | Hirane | ........................ 219/110 |
| 6,020,569 | A | * | 2/2000 | Cecil et al. | .................... 219/109 |
| 6,294,753 | B1 | * | 9/2001 | Fujii et al. | ..................... 219/110 |
| 2005/0029233 | A1 | * | 2/2005 | Schuhen | ................... 219/86.22 |
| 2007/0199556 | A1 | * | 8/2007 | Murai et al. | .................... 126/20 |
| 2010/0243616 | A1 | * | 9/2010 | Goto | ......................... 219/117.1 |
| 2011/0180516 | A1 | * | 7/2011 | Takahashi et al. | ......... 219/86.41 |
| 2012/0074104 | A1 | | 3/2012 | Goto et al. | |

FOREIGN PATENT DOCUMENTS

| | | | |
|---|---|---|---|
| JP | H7-37478 | 7/1995 | |
| JP | H8-71656 A | 3/1996 | |
| JP | 09155410 A | * 6/1997 | ............. B21B 15/00 |

(Continued)

OTHER PUBLICATIONS

Notification of Reason(s) for Refusal dated Jun. 11, 2013.

*Primary Examiner* — Tu B Hoang
*Assistant Examiner* — Alba Rosario-Aponte
(74) *Attorney, Agent, or Firm* — McGinn IP Law Group PLLC (57) ABSTRACT

There is provided a spot welding apparatus. The spot welding apparatus includes a fixed electrode and a movable electrode that clamp and press a workpiece formed of stacked plates of different rigidities, and a control pressing force applicator that causes a control pressing force applying actuator to bring a receiving unit provided at a distal end of a control pressing force applying arm into contact with the workpiece so as to apply a control pressing force to the workpiece. The control pressing force applying arm is made of a non-magnetic material.

20 Claims, 7 Drawing Sheets

(56) References Cited

FOREIGN PATENT DOCUMENTS

| | | | |
|---|---|---|---|
| JP | 2003-251469 A | 9/2003 | |
| JP | 2005066651 A * | 3/2005 | ............ B23K 11/36 |
| JP | 2006-272345 A | 10/2006 | |
| JP | 2009-183996 A | 8/2009 | |
| JP | 2011-11259 A | 1/2011 | |
| WO | WO 2010140605 A1 * | 12/2010 | |

* cited by examiner

SPOT WELDING APPARATUS

CROSS-REFERENCE TO RELATED APPLICATIONS

The present application claims priority from Japanese Patent Application No. 2011-173687 filed on Aug. 9, 2011, the entire contents of which are hereby incorporated by reference.

BACKGROUND OF THE INVENTION

1. Field of the Invention

The present invention relates to a spot welding apparatus that spot-welds a workpiece in the form of a plate assembly including stacked plates of different rigidities.

2. Description of the Related Art

Generally, a spot welding technique is widely used for joining stacked plates, such as steel plates. The spot welding technique involves using a pair of welding electrodes to clamp and apply a pressing force to the stacked plates, and applying current between the welding electrodes for a predetermined time period.

Figure 6A:
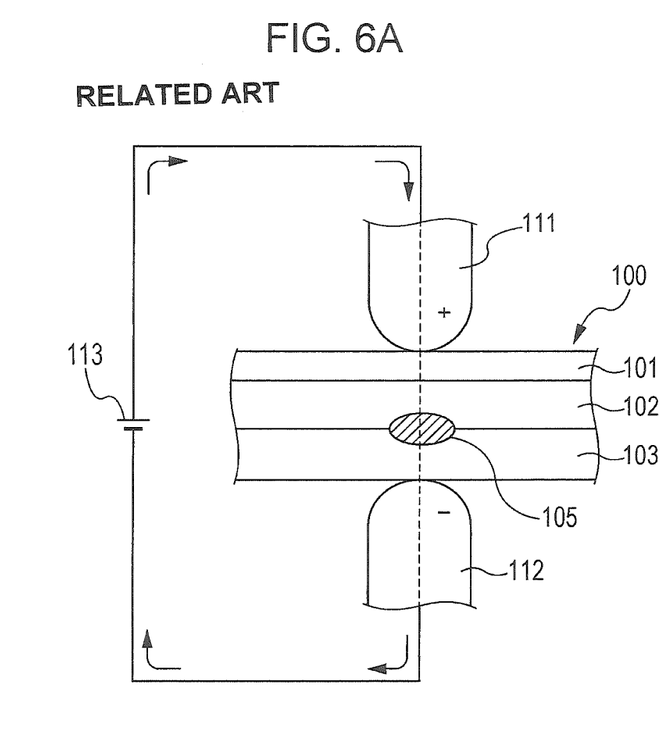
FIGS. 6A and 6B are diagrams schematically illustrating a spot welding process according to related art.

Referring to FIG. 6A, when spot-welding a workpiece 100 in the form of a plate assembly including three stacked plates, i.e., a thin plate 101 having a lower rigidity, and a first thick plate 102 and a second thick plate 103 having a higher rigidity than the thin plate 101, a movable electrode 111 and a fixed electrode 112 clamp the workpiece 100 therebetween such that the thin plate 101 is in tight contact with the first thick plate 102, and that the first thick plate 102 is in tight contact with the second thick plate 103. Then, when a power source 113 applies current to the workpiece 100 via the movable electrode 111 and the fixed electrode 112, the current density in an electric path between the movable electrode 111 and the fixed electrode 112 becomes substantially uniform. Thus, a good nugget is formed that extends from the thin plate 101 to the second thick plate 103, thereby achieving the required weld strength.

In actuality, however, when the workpiece 100 is clamped and pressed between the movable electrode 111 and the fixed electrode 112, the thin plate 101 having a lower rigidity and the first thick plate 102 bend upward, causing gaps to form between the thin plate 101 and the first thick plate 102 as well as between the first thick plate 102 and the second thick plate 103.

In this case, the contact area between the movable electrode 111 and the thin plate 101 is increased due to the bending of the thin plate 101, whereas the contact area of the joint section between the thin plate 101 and the first thick plate 102 and the contact area of the joint section between the first thick plate 102 and the second thick plate 103 are reduced due to the gaps. Therefore, the current density between the movable electrode 111 and the fixed electrode 112 at the second thick plate 103 side becomes higher than that at the thin plate 101 side. This results in a greater local calorific value between the first thick plate 102 and the second thick plate 103 than between the thin plate 101 and the first thick plate 102.

Figure 6B:
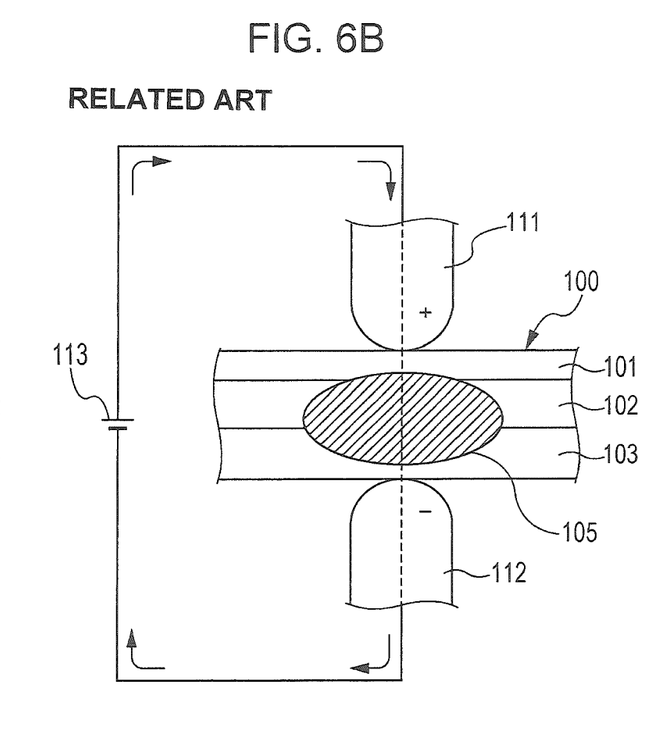

As a result, as shown in FIG. 6A, a nugget 105 is first formed at the joint section between the first thick plate 102 and the second thick plate 103. Then, as shown in FIG. 6B, the nugget 105 gradually grows so that the thin plate 101 and the first thick plate 102 are ultimately welded to each other. However, because the amount of weld penetration between the thin plate 101 and the first thick plate 102 is small, the weld strength is poor. Thus, the thin plate 101 may be separated from the first thick plate 102, and the welding quality varies. This problem becomes prominent particularly when the thickness of the first thick plate 102 and the thickness of the second thick plate 103 are increased since the increased thicknesses make it difficult for the nugget 105 to reach the joint section between the first thick plate 102 and the thin plate 101.

Figure 7:
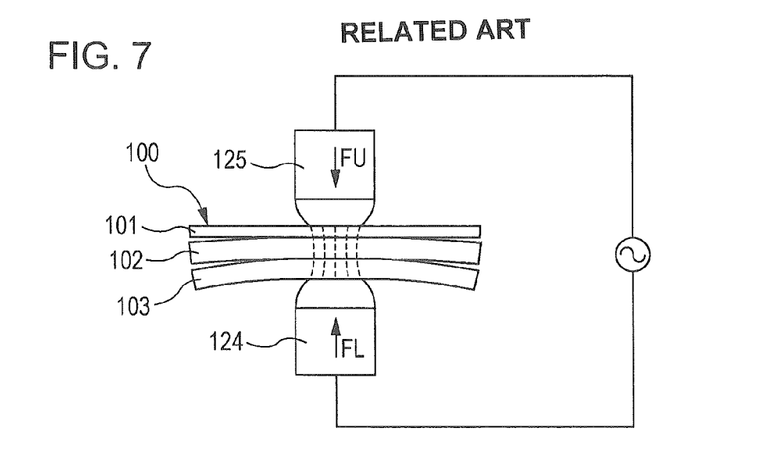
FIG. 7 is a diagram schematically illustrating the spot welding process according to the related art.

Japanese Unexamined Patent Application Publication No. 2003-251469 discloses an example of a spot welding method as a countermeasure against this problem. Specifically, as shown in FIG. 7, when spot-welding the workpiece 100 formed or three stacked plates, i.e., the thin plate 101, the first thick plate 102, and the second thick plate 103, a pressing force FU of a movable electrode 125 at the thin plate 101 side is set to be lower than a pressing force FL of a fixed electrode 124 at the second thick plate 103 side. Thus, the contact resistance between the thin plate 101 and the first thick plate 102 is increased, whereas the contact resistance between the first thick plate 102 and the second thick plate 103 is reduced. Accordingly, when current is applied between the movable electrode 125 and the fixed electrode 124, the calorific value at the joint section between the thin plate 101 and the first thick plate 102 is increased, thereby increasing the weld strength between the thin plate 101 and the first thick plate 102.

Figure 8:
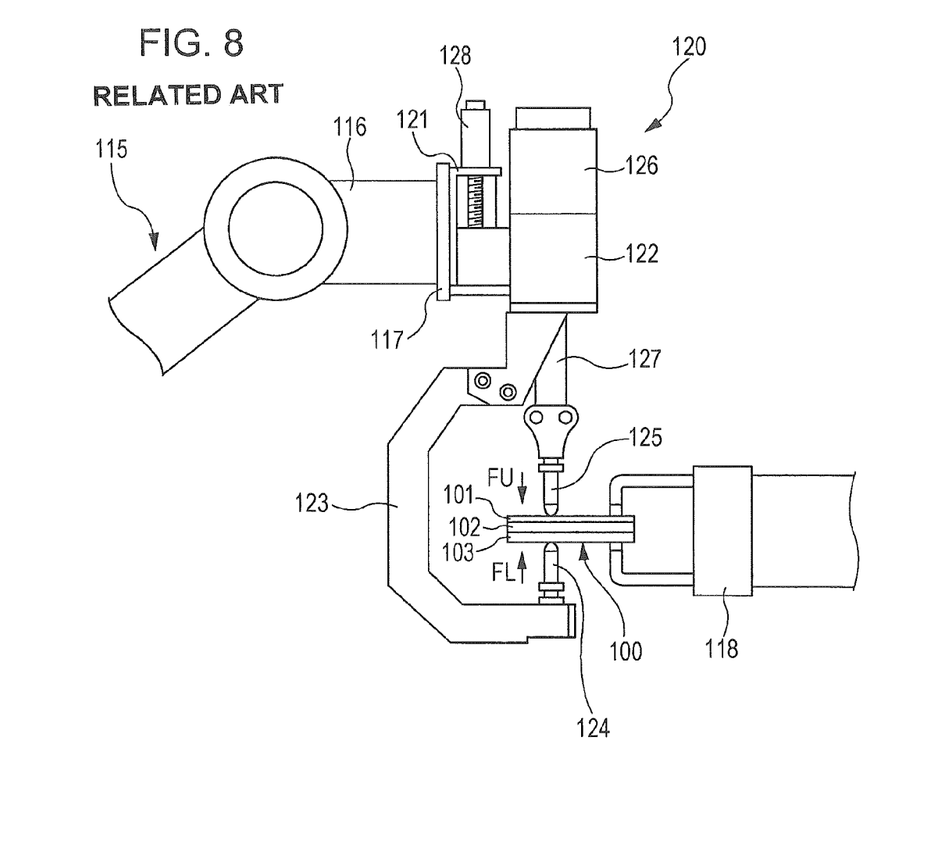
FIG. 8 is a diagram schematically illustrating the spot welding process according to related art.

FIG. 8 illustrates the configuration of a spot welding apparatus used for implementing this method. Specifically, a spot welding apparatus 120 is attached to a wrist 116 of a welding robot 115. The welding robot 115 moves the spot welding apparatus 120 to each spot welding position of the workpiece 100 supported by a clamper 118 and spot-welds the workpiece 100.

The spot welding apparatus 120 includes a base 122 that is vertically movably supported by a linear guide 121. The linear guide 121 is fixed to a support bracket 117 attached to the wrist 116. A fixed arm 123 extending downward is provided on the base 122. The fixed electrode 124 is provided at a distal end of the fixed arm 123.

A pressure actuator 126 is attached to an upper end of the base 122 and is configured to move a rod 127 vertically. The movable electrode 125 is attached to a lower end of the rod 127 so as to face the fixed electrode 124. A servomotor 128 is attached to an upper end of the support bracket 117. The servomotor 128 is configured to move the base 122 vertically by means of a ball screw mechanism.

Based on teaching data stored in advance in a controller (not shown), the pressing force FU of the movable electrode 125 located at the thin plate 101 side is set to be lower than the pressing force FL of the fixed electrode 124 (FU<FL).

In order to set the pressing force FU of the movable electrode 125 to be lower than the pressing force FL of the fixed electrode 124 (FU<FL) in this manner, the controller first causes the servomotor 128 to move the base 122 upward so as to bring the fixed electrode 124 into contact with a lower surface of the workpiece 100, and causes the pressure actuator 126 to move the movable electrode 125 downward so as to bring the movable electrode 125 into contact with an upper surface of the workpiece 100. In this case, the pressing force of the pressure actuator 126 is uniformly applied to the movable electrode 125 and the fixed electrode 124 via the base 122 and the fixed arm 123.

Subsequently, the base 122 is moved upward by the servomotor 128. When the base 122 is moved upward, the pressing force FL of the fixed electrode 124 increases by an amount corresponding to the distance of the upward movement of the base 122, whereby the pressing force FU of the movable electrode 125 becomes lower than the pressing force FL of the fixed electrode 124 (FU<FL).

As a result, when current is applied between the movable electrode 125 and the fixed electrode 124, the current density at the joint section between the thin plate 101 and the first thick plate 102 becomes high, causing the calorific value to become relatively higher than the calorific value at the joint section between the first thick date 102 and the second thick plate 103. Consequently, a good uniform nugget is formed that extends from the thin plate 101 to the second thick plate 103, thereby ensuring a high weld strength.

In the above Japanese Unexamined Patent Application Publication No. 2003-251469, the fixed electrode 124 is brought into contact with the second thick plate 103 of the workpiece 100 clamped by the clamper 118, and the movable electrode 125 is brought into contact with the thin plate 101. Further, the pressing force FU of the movable electrode 125 is set to be lower than the pressing force FL of the fixed electrode 124 by moving the base 122 upward. Then, the current density between the thin plate 101 and the first thick plate 102 becomes relatively higher. Thus, a sufficient calorific value can be obtained at the joint section between the thin plate 101 and the first thick plate 102, thereby achieving an increased amount of weld penetration and increased weld strength.

However, when setting the pressing force FU of the movable electrode 125 to be lower than the pressing force FL of the fixed electrode 124 by moving the base 122 while the workpiece 100 is clamped by the clamper 118 and is held and pressed between the fixed electrode 124 and the movable electrode 125, a large load is placed on the clamper 118 clamping the workpiece 100. On the other hand, if the clamped position of the workpiece 100 clamped by the clamper 118 and the welding position of the workpiece 100 are markedly distant from each other, the workpiece 100 deforms and bends. This causes the pressing force FL of the fixed electrode 124 and the pressing force FU of the movable electrode 125 to vary, making it difficult to obtain stable contact resistance between the thin plate 101 and the first thick plate 102 and stable contact resistance between the first thick plate 102 and the second thick plate 103. This may result in variations in the current density at the joint sections, leading to reduced spot welding quality.

SUMMARY OF THE INVENTION

Accordingly, it is an object of the present invention to provide a spot welding apparatus that can achieve high welding quality when spot-welding a workpiece in the form of a plate assembly including stacked plates of different rigidities.

According to a first aspect of the present invention, there is provided a spot welding apparatus including a first welding electrode, a second welding electrode that is disposed to face the first welding electrode and is configured to clamp and press a workpiece together with the first welding electrode, and control pressing force applicator configured to apply a control pressing force to the workpiece by bringing a pressing force applying unit disposed adjacent to the first welding electrode into contact with the workpiece. Spot welding is performed by applying current between the first welding electrode and second welding electrode while the workpiece is clamped and pressed by the first welding electrode and the pressing force applying unit of the control pressing force applicator that are in contact with the workpiece, and the second welding electrode that faces the first welding electrode and is in contact with the workpiece. The control pressing force applicator includes a control pressing force applying arm on which the pressing force applying unit is provided. The control pressing force applying arm is made of a non-magnetic material. The control pressing force applicator is configured to apply the control pressing force to the workpiece by bringing the pressing force applying unit provided on control pressing force applying arm into contact with the workpiece.

According to the above aspect, a pressing force of the first welding electrode and a control pressing force of the pressing force applying unit of the control pressing force applicator are applied to the workpiece, while a pressing force of the second welding electrode facing the first welding electrode is applied to the workpiece. That is, the pressing force of the first welding electrode is smaller than the pressing force of the second welding electrode. Accordingly, when current is applied between the first welding electrode and the second welding electrode while clamping and pressing a workpiece formed of, for example, a thin plate having a lower rigidity and first and second thick plates having a higher rigidity than the thin plate that are stacked one on another, the current density at a joint section between the thin plate and the first thick plate is relatively higher. Thus, a good nugget is formed that extends from the thin plate to the second thick plate, thereby providing the workpiece of high welding quality.

On the other hand, when welding is performed, a Large welding current flows through the first welding electrode and the second welding electrode, so that a magnetic field is generated around the first welding electrode and the second welding electrode. However, since the control pressing force applying arm disposed close to the first welding electrode and the second welding electrode is made of a non-magnetic material, it is possible to prevent occurrence of electromagnetic induction heating in the control pressing force applying arm, or minimize the risk of occurrence of electromagnetic induction heating. Therefore, temperature rise of the control pressing force applying arm is suppressed, which prevents the control pressing force applying arm from being affected by heat. Furthermore, since the temperature rise of the control pressing force applying arm is suppressed, the control pressing force applicator is prevented from being affected by heat of the control pressing force applying arm. This allows the control pressing force applicator to operate stably, and ensures the durability of the control pressing force applicator. Also, since the temperature of the control pressing force applying arm is prevented from becoming excessively high, workability in maintenance and the like is improved.

According to a second aspect of the present invention, in the spot welding apparatus according to the first aspect, the control pressing force applicator may include a control pressing force applying actuator that has a movable shaft which moves reciprocally, and the control pressing force applying arm that has a base end connected to the movable shaft and has a distal end on which the pressing force applying unit is provided. The control pressing force applying arm is made of the non-magnetic material. The control pressing force applicator may be configured to apply the control pressing force to the workpiece by moving the movable shaft of the control actuator and thereby bringing the pressing force applying unit provided on the distal end of the control pressing force applying arm into contact with the workpiece.

According to the above aspect, since the control pressing force applying arm is made of a non-magnetic material, it is possible to prevent occurrence of electromagnetic induction heating in the control pressing force applying arm, or minimize the risk of occurrence electromagnetic induction heating. Therefore, temperature rise of the control pressing force applying arm is suppressed, which prevents the control pressing force applying arm from being affected by heat. Furthermore, since the temperature rise of the control pressing force applying arm is suppressed, the control pressing force applying actuator is prevented from being affected by heat of the control pressing force applying arm. This allows the control pressing force applicator to operate stably, and ensures the durability of the control pressing force applicator. Also, since the temperatures of the control pressing force applying actuator and the control pressing force applying arm of the control pressing force applicator are prevented from becoming excessively high, workability in maintenance and the like is improved.

According to a third aspect of the present invention, in the spot welding apparatus according to the second aspect, the control pressing force applying arm may include a base end arm that has a base end connected to the movable shaft and extends in a direction at an angle with respect to the movable shaft, an arm that has a base end connected to a distal end of the base end arm and extends in an axial direction of the first welding electrode, and a movable receiving unit that has a base end connected to a distal end of the arm and has a distal end on which the pressing force applying unit is provided. The movable receiving unit may be made of a non-magnetic material.

According to a fourth aspect of the present invention, in the above-described spot welding apparatus according to the second aspect, the control pressing force applying arm may include a base end arm that has a base end connected to the movable shaft and extends in a direction at an angle with respect to the movable shaft, an arm that has a base end connected to a distal end of the base end arm and extends in an axial direction of the first welding electrode, and a movable receiving unit that has a base end connected to a distal end of the arm and has a distal end on which the pressing force applying unit is provided. The arm may be made of a non-magnetic material. The movable receiving unit may be made of a non-magnetic material.

The third and fourth aspects illustrate exemplary configurations of the control pressing force applying arm. Since the control pressing force applying arm has an angular C shape formed of the base end arm, the arm, and the movable receiving unit, and since the receiving unit is provided at the distal end of the movable receiving unit, the control pressing force applying arm is prevented from coming into contact with the workpiece when positioning the spot welding apparatus at the welding position of the workpiece. This makes it possible to improve the workability. Further, since the movable receiving unit and the arm, which are disposed close to the first welding electrode and the second welding electrode around which a magnetic field is generated during a welding process, are made of a non-magnetic material, or since only the movable receiving unit is made of a non-magnetic material, it is possible to prevent or minimize the risk of occurrence of electromagnetic induction heating in the control pressing force applying arm. This also makes it possible to reduce the manufacturing cost of the control pressing force applying arm.

According to a fifth aspect of the present invention, in the spot welding apparatus according to any one of the second through fourth aspects, the control pressing force applying arm may have an outer surface having a corrugated heat transfer structure. According to this above aspect, since the outer surface of the control pressing force applying arm has a corrugated heat transfer structure, heat transfer from the control pressing force applying arm is promoted. Accordingly, temperature rise of the control pressing force applying arm is further suppressed.

According to a sixth aspect of the present invention, in the above-described spot welding apparatus according to any one of the second through fifth aspects, the non-magnetic material may include a non-magnetic stainless steel. The sixth aspect illustrates an example of the non-magnetic material. Use of a non-magnetic stainless steel having high rigidity and high corrosion resistance can ensure the rigidity of the control pressing force applying arm and improve the durability.

According to a seventh aspect of the present invention, the spot welding apparatus according to any one of the first through sixth aspects, the control pressing force applying arm may include a water passage in which cooling water flows and may be cooled by the cooling water. According to this aspect, since the control pressing force applying arm is cooled by the cooling water, temperature rise of the control pressing force applying arm is further suppressed, which prevents the control pressing force applying arm from being affected by heat. Furthermore, since the temperature rise of the control pressing force applying arm is suppressed, the control pressing force applying actuator is prevented from being affected by heat of the control pressing force applying arm. This allows the control pressing force applicator to operate stably, and ensures the durability of the control pressing force applicator.

According to an embodiment of the present invention, a pressing force of the first welding electrode and a control pressing force of the pressing force applying unit are applied to the workpiece, while a pressing force of the second welding electrode facing the first welding electrode is applied to the workpiece. The pressing force of the first welding electrode is smaller than the pressing force of the second welding electrode. Accordingly, the welding quality of the workpiece formed of stacked plates of different rigidities is improved.

Meanwhile, since the control pressing force applying arm disposed close to the first welding electrode and the second welding electrode is made of a non-magnetic material, it is possible to prevent occurrence of electromagnetic induction heating in the control pressing force applying arm. Therefore, temperature rise of the control pressing force applying arm is suppressed, which prevents the control pressing force applying arm from being affected by heat. Furthermore, the control pressing force applicator prevented from being affected by heat of the control pressing force applying arm. This allows the control pressing force applicator to operate stably, and ensures the durability of the control pressing force applicator.

DESCRIPTION OF THE PREFERRED EMBODIMENTS

First Embodiment

Figure 1:
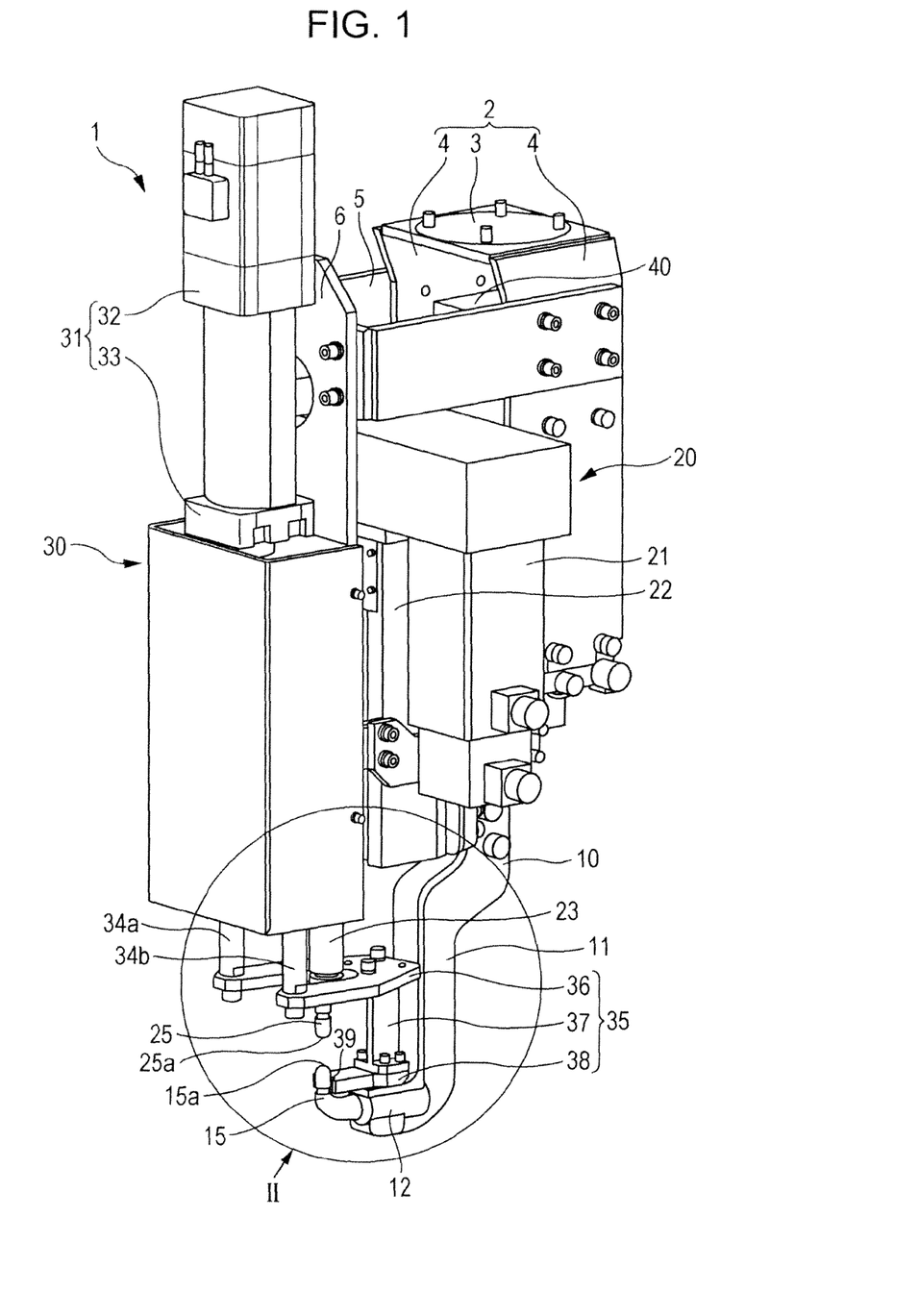
FIG. 1 is a diagram illustrating the configuration of a spot welding apparatus according to a first embodiment.
Figure 2:
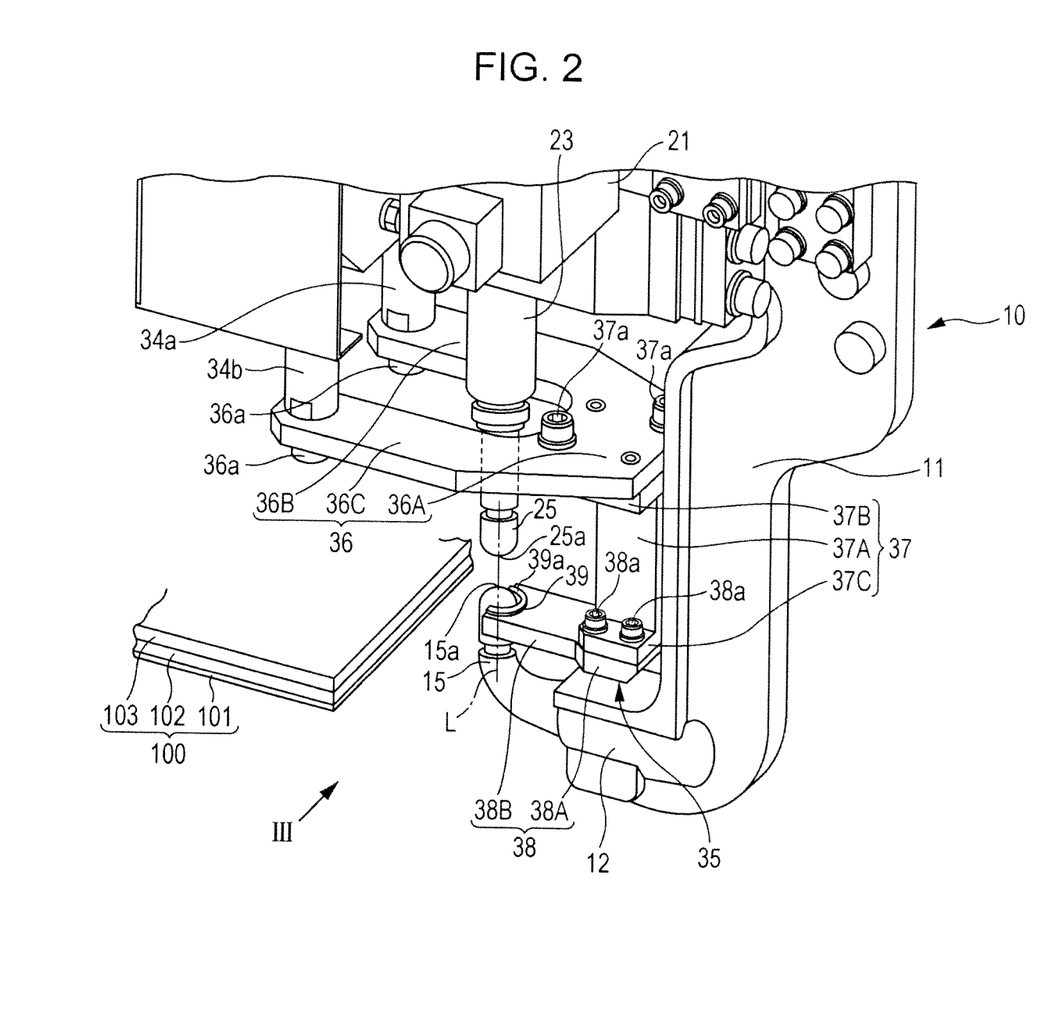
FIG. 2 is an enlarged perspective view illustrating a part indicated by II in FIG. 1.
Figure 3:
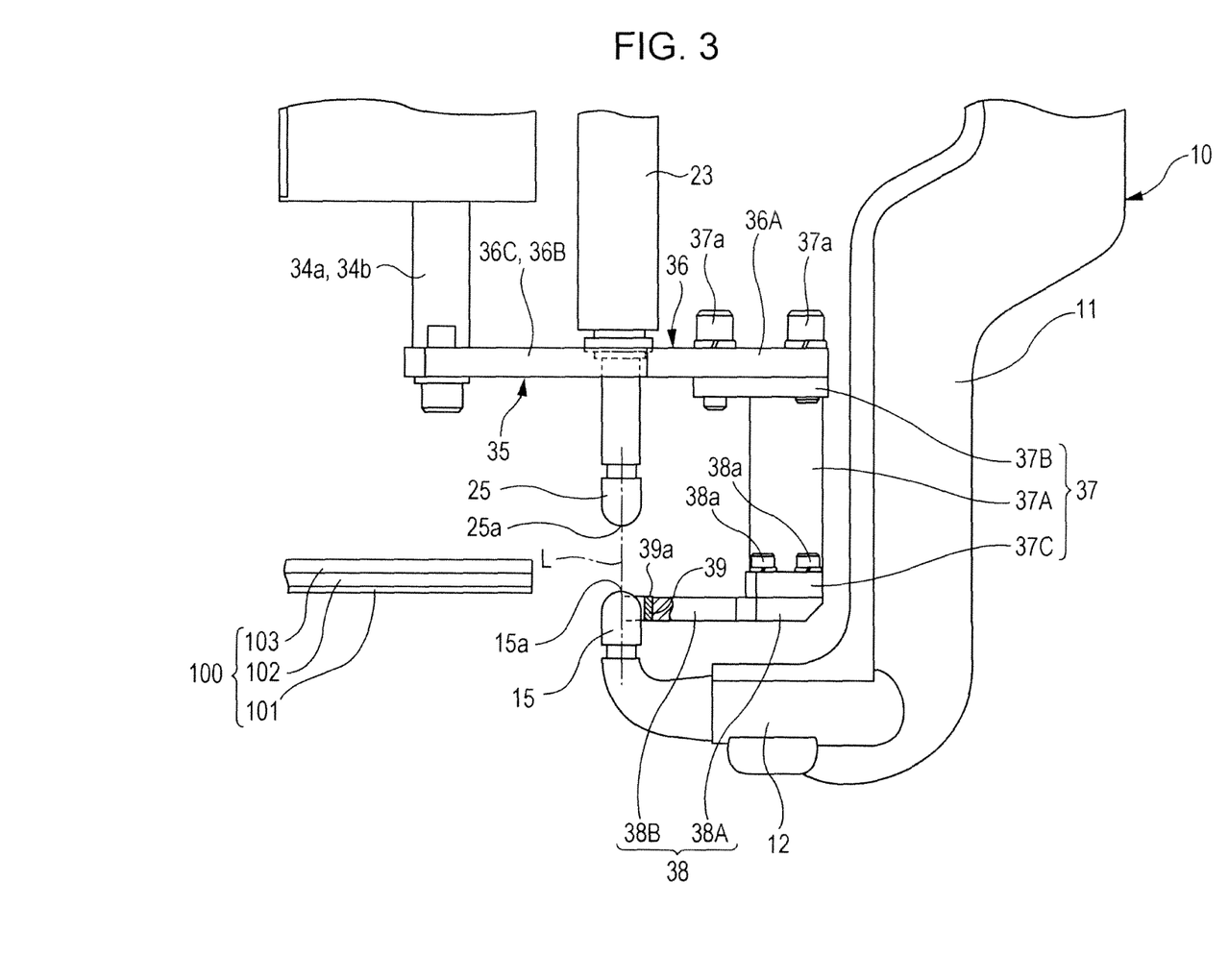
FIG. 3 is a view taken in the direction of the arrow III in FIG. 2.
Figure 4A:
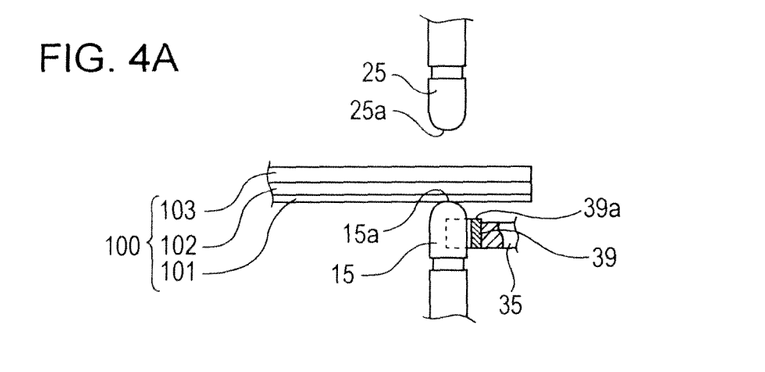
FIGS. 4A through 4C are schematic operational diagrams.
Figure 4B:
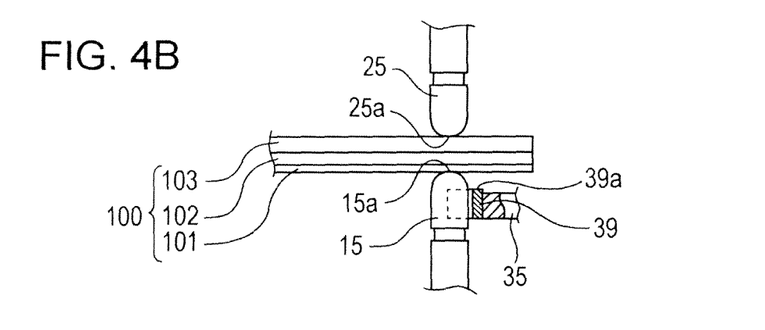
Figure 4C:
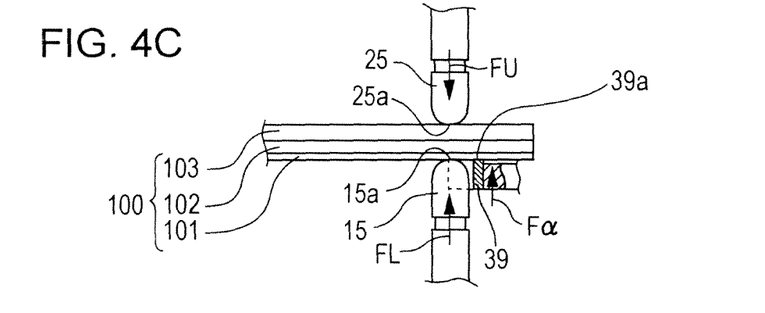

A first embodiment of the present invention will be described with reference to FIGS. 1 through 40 FIG. 1 is a diagram illustrating the configuration of a spot welding apparatus 1. FIG. 2 is an enlarged perspective view illustrating a part indicated by II in FIG. 1. FIG. 3 is a view taken in the direction of the arrow III in FIG. 2. FIGS. 4A through 4C are schematic operational diagrams. In the following description of the spot welding apparatus 1, for purposes of simplicity of explanation, the upward and downward directions in FIG. 1 are defined as the upward and downward directions of the spot welding apparatus 1, respectively.

Before describing the spot welding apparatus 1, a workpiece 100 will be described first. Referring to FIGS. 2 and 3, the workpiece 100 is a three-plate assembly formed by stacking a thin plate over one of two stacked thick plates. More specifically, the workpiece 100 includes a thin plate 101 having a lower rigidity, and a first thick plate 102 and a second thick plate 103 having a greater thickness and a higher rigidity than the thin plate 101 that are stacked in this order from the bottom.

The spot welding apparatus 1 includes a rectangular base 3 attached to a wrist of a welding robot (not shown) with an equalizer interposed therebetween, and a downwardly open angular C-shaped support bracket 2 having a pair of opposing sides that are formed by bending and extend downward from the opposite sides 4 of the base 3. A fixed arm 10, a pressure actuator 20, control pressing force applicator 30, and a welding transformer 40 are attached to and supported by the support bracket 2.

The fixed arm 10 includes a fixed arm main body 11 extending downward and having a base end connected between lower ends of the opposite sides 4 of the support bracket 2, and an electrode holding unit 12 formed at a distal end of the fixed arm main body 11 and bending in an L shape. A fixed electrode 15 serving as a first welding electrode is attached, with a tip end 15*a* facing upward, to the electrode holding unit 12.

The pressure actuator 20 includes a servomotor 21 and a linear motion unit 22 formed of a ball screw feed mechanism or the like. A rod of the linear motion unit 22 is reciprocated vertically by the servomotor 21. An electrode arm 23 is attached to a lower end of the rod of the linear motion unit 22. A movable electrode 25 serving as a second welding electrode is disposed at a distal end of the electrode arm 23. The movable electrode 25 is arranged coaxially with the fixed electrode 15 on the fixed arm 10, i.e., is arranged on a central axis L, so as to face the fixed electrode 15. Thus, the movable electrode 25 is moved by the servomotor 21 of the pressure actuator 20 along the central axis L between a retracted position defined as an upper movement end which is located above and away from the fixed electrode 15 and a pressing force applying position where the movable electrode 25 clamps the workpiece 100 together with the fixed electrode 15 and applies a pressing force to the workpiece 100. This pressing force is dependent on the rotation torque of the servomotor 21. Accordingly, the pressing force of a desired magnitude can be obtained by controlling the rotation torque of the servomotor 21.

The control pressing force applicator 30 includes a control pressing force applying actuator 31, which includes a servomotor 32 and a linear motion unit 33 formed of a ball screw feed mechanism or the like. The servomotor 32 is attached to a base plate 6 provided on an angular shaped attachment bracket 5. The attachment bracket 5 has opposite ends connected to the corresponding opposite sides 4 of the support bracket 2. A rod of the linear motion unit 33 is vertically reciprocated by the servomotor 32, so that a pair of movable shafts 34*a* and 34*b*, which are provided on a distal end of the rod and are spaced apart from and face each other, are reciprocated. A control pressing force applying arm 35 is attached to distal ends of the movable shafts 34*a* and 34*b*.

The control pressing force applying arm 35 includes a base end arm 36, an arm 37, and a movable receiving unit 38. The base end arm 36 has a base end connected to the distal ends of the movable shafts 34*a* and 34*b*, and extends in a substantially horizontal direction at an angle with respect to the movable shafts 34*a* and 34*b*. The arm 37 has a base end connected to a base end 36A of the base end arm 36 and extends downward in an axial direction of the fixed electrode 15, i.e., the direction of the central axis L. The movable receiving unit 38 has a base end connected to a distal end of the arm 37, extends in the direction of the central axis L, and has a distal end at which a receiving unit 39 serving as a pressing force applying unit is provided.

The base end arm 36 is a substantially U-shaped plate, and includes the base end 36A and attachment arms 36B and 36C. The attachment arms 36B and 36C branched from the base end 36A extend so as to face each other with the electrode arm 23 therebetween, and have distal ends connected to the distal ends of the movable shafts 34*a* and 34*b*, respectively, with bolts 36*a*.

The arm 37 includes an arm main body 37A that is a rectangular plate extending vertically along the central axis L between the fixed arm 10 and the electrode arm 23, an upper attachment flange 37B formed by bending at an upper end defining a base end of the arm main body 37A, and a lower attachment flange 37C formed by bending at a lower end defining a distal end of the arm main body 37A. The upper attachment flange 37B is jointed to a lower surface of the base end 36A of the base end arm 36 and is connected thereto with bolts 37*a*.

The movable receiving unit 38 is a rectangular plate that has a base end 38A connected to the lower attachment flange 37C of the arm 37 with bolts 38*a* and that extends in the direction of the central axis L. A receiving unit 39 is provided at a distal end 38B of the movable receiving unit 38. The receiving unit 39 is coaxial with the central axis L, has a distal end 39*a* projecting upward, and has a semicircular cross-sectional shape, i.e., a semi-cylindrical shape that allows the fixed electrode 15 to extend therethrough.

Further, the base end arm 36, the arm 37, and the movable receiving unit 38 are formed of a non-magnetic material, including non-magnetic stainless steels having high rigidity and high corrosion resistance such as SUS304 and SUS316, so as to ensure the rigidity of the control pressing force applying arm 35 and improve the durability. Furthermore, the outer surfaces of the base end arm 36, the arm 37, and the movable receiving unit 38, except at joint sections therebetween, have a heat transfer structure such as a corrugated pattern and a radiation fin.

The control pressing force applying arm 35 having the configuration as described above is moved by the servomotor 32 along the central axis L between a retracted position where the distal end 39*a* of the receiving unit 39 provided at the distal end of the control pressing force applying arm 35 is located below the tip end 15*a* of the fixed electrode 15 and a control pressing force applying position where the control pressing force applying arm 35 is in contact from below with the workpiece 100 clamped between the fixed electrode 15 and the movable electrode 25 and applies a control pressing force $F\alpha$ to the workpiece 100. This control pressing force $F\alpha$ is dependent on the rotation torque of the servomotor 32. Accordingly, the control pressing force $F\alpha$ of a desired magnitude can be obtained by controlling the rotation torque of the servomotor 32.

The welding transformer 40 serving as the power source has an output terminal electrically connected to the fixed electrode 15 through a bus bar, the fixed arm 10, etc., and the other output terminal electrically connected to the movable electrode 25 through a bus bar, the electrode arm 23, Further, a welding-robot controller (not shown) stores teaching data for the welding robot. The teaching data contains an operation program for sequentially spot-welding the welding spots of the workpiece 100, and the position and orientation of the spot welding apparatus 1 at each welding spot, i.e, at each welding position. A welding controller (not shown) contains an operation program for the spot welding apparatus 1 and controls operations of the pressure actuator 20, the control pressing force applicator 30, and the welding transformer 40.

Next, operations of the spot welding apparatus 1 will be described with reference to schematic operational diagrams of FIGS. 1A through 1C.

When spot-welding the workpiece 100 formed of three plates including the thin plate 101, the first thick plate 102, and the second thick plate 103 which are stacked in that order from the bottom, in accordance with a preset program, the movable electrode 25 is held at its retracted Position away from the fixed electrode 15 and the receiving unit 39 of the control pressing force applicator 30 is held at its retracted position as shown in FIG. 1. Then, the robot controller actuates the welding robot so as to position the spot welding apparatus 1 such that the tip end 15a of the fixed electrode 15 comes into contact with a spot welding position, a welding position of the workpiece 100, as shown in FIG. 4A.

Since the control pressing force applying arm 35 has an angular C shape formed of the base end arm 36, the arm 37, and the movable receiving unit 38, and since the receiving unit 39 is provided at the distal end of the control pressing force applying arm 35, the control pressing force applying arm 35 is prevented from coming into contact with the workpiece 100. Therefore, it is possible to easily position the spot welding apparatus 1 such that the tip end 15a of the fixed electrode 15 comes into contact with the soot welding position of the workpiece 100. This makes it possible to improve the workability.

As shown in FIG. 5A, when the spot welding apparatus is positioned at the welding position, the tip end 15a of the fixed electrode 15 is in contact with the thin plate 101 of the workpiece 100 from below. On the other hand, a tip end 25a of the movable electrode 25 faces the second thick plate 103 with a gap therebetween, and the distal end 39a of the receiving unit 39 faces the thin plate 101 with a gap therebetween.

Subsequently, as shown in FIG. 4B, while having the fixed electrode 15 in contact with the thin plate 101 of the workpiece 100, the movable electrode 25 is moved by the servomotor 21 of the pressure actuator 20 from the retracted position to the pressing force applying position, i.e., toward the fixed electrode 15, so as to be in contact with she second thick plate 103 from above. The servomotor 21 is further driven such that the torque reaches a predetermined level, whereby the movable electrode 25 is brought into pressure contact with the second thick plate 103. Thus, the pressing force the pressure actuator 20 is applied to the movable electrode 25 and the fixed electrode 15 via the fixed arm 10, whereby the weld section of the workpiece 100 is clamped and pressed between the movable electrode 25 and the fixed electrode 15.

Meanwhile, the rod of the linear motion unit 33 is moved upward by the servomotor 32 of the control pressing force applicator 30, whereby the movable shafts 34a and 34b and the control pressing force applying arm 35 are moved such that the receiving unit 39 provided at the distal end of the control pressing force applying arm 35 moves from the retracted position to the control pressing force applying position where the distal end 39a is located adjacent to the fixed electrode 15 and is in pressure contact with the thin plate 101 of the workpiece 100 from below.

The servomotor 32 is further driven such that the torque reaches a predetermined level, whereby the receiving unit 39 is brought into pressure contact with the thin plate 101 so as to apply a control pressing force Fα to the thin plate 101.

When the control pressing force Fα is applied to the workpiece 100 from below by the receiving unit 39 located adjacent to the fixed electrode 15 while clamping and pressing the workpiece 100 between the fixed electrode 15 and the movable electrode 25 in the manner as described above, the pressing force FU of the movable electrode 25 is applied to the second thick plate 103 of the workpiece 100 from above, whereas the pressing force FL of the fixed electrode 15 and the control pressing force Fα of the receiving unit 39 are applied side-by-side to the thin plate 101, as shown in FIG. 4C.

In this case, as schematically shown in FIG. 4C, the pressing force of the pressure actuator 20 is applied to the movable electrode 25 via the electrode arm 23, etc., and is also applied to the fixed electrode 15, facing the movable electrode 25, via the fixed arm 10. Meanwhile, an urging force of the servomotor 32 of the control Pressing force applicator 30 is applied to the receiving unit 39 via the control pressing force applying arm 35, etc. The pressing force FU of the movable electrode 25 applied to the second thick plate 103 from above is equal to the sum of the pressing force FL of the fixed electrode 15 and the control pressing force Fα of the receiving unit 39 that are applied to the thin plate 101 from below (FU=FL+Fα).

Consequently, the workpiece 100 is stably held with the pressing force FU of the movable electrode 25 that is applied to the second thick plate 103 from above, the pressing force FL of the fixed electrode 15 and the control pressing force Fα of the receiving unit 39 that are applied to the thin plate 101 from below.

On the other hand, in the weld section of the workpiece 100, the Pressing force FU is applied to the second thick plate 103 by the movable electrode 25, whereas the pressing force FL and the control pressing force Fα are applied to the thin plate 101 by the fixed electrode 15 and the receiving unit 39, respectively. That is, the Pressing force FL of the fixed electrode 15 applied to the thin plate 101 is equal to a pressing force obtained by subtracting the control pressing force Fα of the receiving unit 39 from the pressing force FU of the movable electrode 25 (FL=FU−Fα).

When the pressing force FL of the fixed electrode 15 applied to the thin plate 101 side is set to be lower than the pressing force FU of the movable electrode 25 applied to the second thick plate 103 side (FL<FU) as described above, the contact pressure at the joint section between the thin plate 101 and the first thick plate 102 becomes less than the contact pressure at the joint section between the first thick plate 102 and the second thick plate 103. Consequently, the contact resistance between the thin plate 101 and the first thick plate 102 becomes relatively higher, whereas the contact resistance between the first thick plate 102 and the second thick plate 103 becomes relatively lower.

Subsequently, while the workpiece 100 is clamped and pressed between the movable electrode 25 and a combination of the fixed electrode 15 and the receiving unit 39 and while the pressing force FL of the fixed electrode 15 located at the thin plate 101 side is set to be lower than pressing force FU of the movable electrode 25 located at the second thick plate 103 side, welding is performed by applying current between the movable electrode 25 and the fixed electrode 15 from the welding transformer 40 for a predetermined time period.

When current is applied between the movable electrode 25 and the fixed electrode 15, the contact resistance at the joint section between the thin plate 101 and the first thick plate 102 becomes relatively higher, making the current density greater, whereas the contact resistance between the first thick plate 102 and the second thick plate 103 remains small. Thus, the calorific value at the joint section between the thin plate 101 and the first thick plate 102 becomes relatively higher than the calorific value at the joint section between the first thick plate 102 and the second thick plate 103. Consequently, a good nugget is formed that extends from the thin plate 101 to the second thick plate 103 without a variation in the current density, the ensuring the weld strength of the thin plate 101.

On the other hand, when welding is performed, a Large welding current flows through the movable electrode 25 and the fixed electrode 15, so that a magnetic field is generated around the movable electrode 25 and the fixed electrode 15. Since the base end arm 36, the arm 37, and the movable receiving unit 38 of the control pressing force applying arm 35 disposed close to the movable electrode 25 and the fixed electrode 15 are made of a non-magnetic material such as a non-magnetic stainless steel, it is possible to event occurrence of electromagnetic induction heating in the control pressing force applying arm 35, or reduce the risk of occurrence of electromagnetic induction heating. Furthermore, the outer surfaces of the base end arm 36, the arm 37, and the movable receiving unit 38 have a heat transfer structure including a corrugated pattern. Therefore, temperature rise of the control pressing force applying arm 35 is suppressed, which prevents the control pressing force applying arm 35 from being affected by heat. Furthermore, since the temperature rise of the control pressing force applying arm 35 is suppressed, the control pressing force applying actuator 31 including the linear motion unit 33 and the servomotor 32 is prevented from being affected by heat of the control pressing force applying arm 35. This allows the control pressing force applicator 30 to operate stably, and ensures the durability of the control pressing force applicator 30. Also, since the temperature of the control pressing force applicator 30 is prevented from becoming excessively high, operators are prevented from being injured by heat, and therefore workability in maintenance and the like is improved.

It should be noted that, if needed, the movable receiving unit 38 and the arm 37, which are disposed close to the movable electrode 25 and the fixed electrode 15 and might be affected by a magnetic field during a welding process, may be made of a non-magnetic material, or only the movable electrode 25 may be made of a non-magnetic material. In this case, it is possible to reduce the manufacturing cost of the spot welding apparatus 1.

Second Embodiment

Next, a second embodiment of the present invention will be described with reference to FIG. 5. In this embodiment, a structure that cools the control pressing force applying arm 35 of the first embodiment with use of cooling water is provided. Other components of this embodiment are the same as those of the first embodiment and are denoted by the same reference numerals, and detailed descriptions thereof will be omitted.

Figure 5:
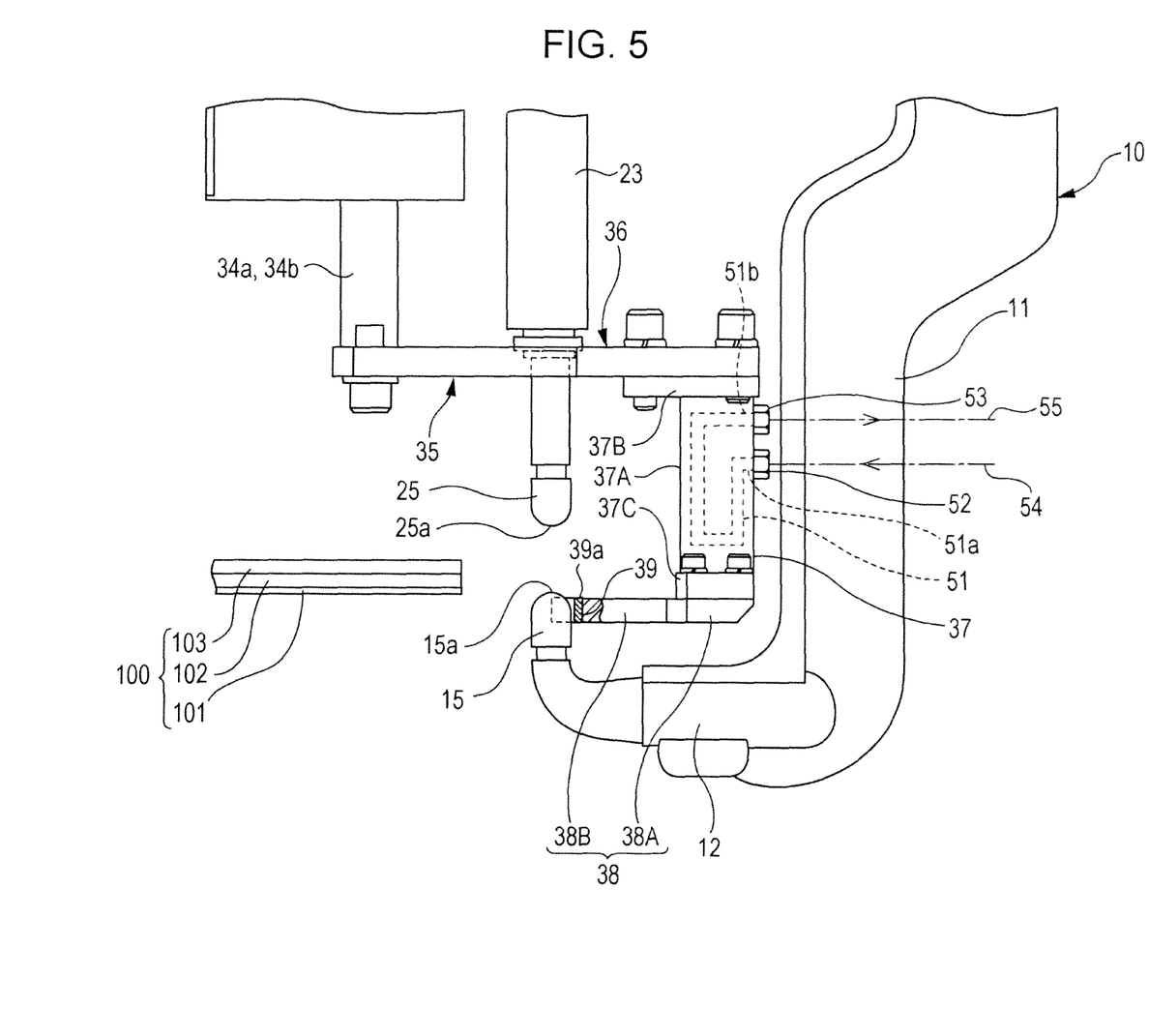
FIG. 5 is a diagram illustrating the configuration of a spot welding apparatus according to a second embodiment.

FIG. 5 is a diagram corresponding to FIG. 3. As schematically shown in FIG. 5, a water passage 51 is formed inside the arm 37 of the control pressing force applying arm 35. The water passage 51 has a water inlet 51a and a water outlet 51b in the outer peripheral surface of the arm 37. A plug 52 serving as a connection member for connection to a supply pipe 54 for supplying cooling water is attached to the water inlet 51a, while a plug 53 serving as a connection member for connection to a discharge pipe 55 is attached to the water outlet 51b. The supply pipe 54 is connected to a cooling water supply pump or the like that serves as the cooling water supply source, while the discharge pipe 55 is connected to a cooling water collecting unit.

Thus, a cooling water circulation path is formed in which cooling water is supplied from the supply pipe 54 through the water inlet 51a, flows through the water passage 51 in the arm 37, and is discharged from the water cutlet 51b into the discharge pipe 55. The cooling water cools the arm 37 while flowing through the water passage 51 extending from the water inlet 51a side to the water outlet 51b.

When the arm 37 is cooled, the movable receiving unit 38 and the base end arm 36 connected to the arm 37 are cooled, so that the entire control pressing force applying arm 35 is cooled. Accordingly, the control pressing force applying arm 35 is prevented from being affected by heat, more reliably than in the first embodiment. Furthermore, since the control pressing force applying arm 35 is cooled, the control pressing force applying actuator 31 including the linear motion unit 33 and the servomotor 32 is prevented from being affected by heat of the control pressing force applying arm 35. This allows the control pressing force applicator 30 to operate stably, and ensures the durability of the control pressing force applicator 30.

It should be noted that, in addition to the arm 37, or in place of the arm 37, a similar water passage may be formed in the movable receiving unit 38 and/or the base end arm 36 so as to cool the movable receiving unit 38 and/or the base end arm 36 by circulation of cooling water.

It should be noted that the present invention is not Limited to the foregoing embodiments, and various modifications may be made without departing from the scope of the present invention. For example, although the receiving unit 39 has a semi-cylindrical shape in the above embodiments, the receiving unit 39 may be formed in a cylindrical shape or may be a projection. Further, although the control pressing force applying arm 35 is formed by connecting the base end arm 36, the arm 37, and the movable receiving unit 38 to one another in the above embodiments, these parts may not be formed as separate parts but may be formed as a single part.

What is claimed is:

1. A spot welding apparatus comprising:
a first fixed welding electrode;
a second movable welding electrode which is moved by a pressure actuator, and the second movable welding electrode is disposed to face the first fixed welding electrode and configured to clamp and press at least three workpieces together with the first fixed welding electrode; and
a control pressing force applicator configured to apply a control pressing force to a workpiece of the at least three workpieces by bringing a pressing force applying unit disposed adjacent to the first fixed welding electrode into contact with a lower surface of a thinnest workpiece of the at least three workpieces;
wherein spot welding is performed by applying current between the first fixed welding electrode and the second movable welding electrode while the workpiece is clamped and pressed by the first fixed welding electrode that is in contact with the workpiece, the pressing force applying unit of the control pressing force applicator that is in contact with the workpiece, and the second movable welding electrode that faces the first fixed welding electrode and is in contact with the workpiece; and wherein the control pressing force applicator includes:
- a control pressing force applying actuator that has a movable shaft which moves reciprocally; and
- a control pressing force applying arm that comprises a non-magnetic material and includes:
  - a base end arm that has a base end connected to the movable shaft and extends in a direction at an angle with respect to the movable shaft;
  - the base end arm is formed of a U-shaped plate surrounding only half of the second movable welding electrode and has a semi-circular cross-section shape that allows the second movable welding electrode to move therethrough;
  - a pair of ends of the U-shaped plate of the base end arm are each connected to the movable shaft which extends below the actuator;
  - an arm that has a base end connected to a distal end of the base end arm and extends in an axial direction of the first fixed welding electrode;
  - a movable receiving unit that has a base end connected to a distal end of the arm and has a distal end on which the pressing force applying unit is provided; and wherein the control pressing force applicator is configured to apply the control pressing force to the workpiece by moving the movable shaft of the control pressing force applying actuator and thereby bringing the pressing force applying unit provided on the distal end of the arm into contact with the workpiece.

2. The spot welding apparatus according to claim 1, wherein the arm comprises a non-magnetic material.

3. The spot welding apparatus according to claim 1, wherein the control pressing force applying arm has an outer surface having a corrugated heat transfer structure.

4. The spot welding apparatus according to claim 2, wherein the control pressing force applying arm has an outer surface having a corrugated heat transfer structure.

5. The spot welding apparatus according to claim 1, wherein the non-magnetic material includes a non-magnetic stainless steel.

6. The spot welding apparatus according to claim 2, wherein the non-magnetic material includes a non-magnetic stainless steel.

7. The spot welding apparatus according to claim 3, wherein the non-magnetic material includes a non-magnetic stainless steel.

8. The spot welding apparatus according to claim 4, wherein the non-magnetic material includes a non-magnetic stainless steel.

9. The spot welding apparatus according to claim 1, wherein the control pressing force applying arm includes a water passage in which cooling water flows and is cooled by the cooling water.

10. The spot welding apparatus according to claim 2, wherein the control pressing force applying arm includes a water passage in which cooling water flows and is cooled by the cooling water.

11. The spot welding apparatus according to claim 3, wherein the control pressing force applying arm includes a water passage in which cooling water flows and is cooled by the cooling water.

12. The spot welding apparatus according to claim 4, wherein the control pressing force applying arm includes a water passage in which cooling water flows and is cooled by the cooling water.

13. The spot welding apparatus according to claim 5, wherein the control pressing force applying arm includes a water passage in which cooling water flows and is cooled by the cooling water.

14. The spot welding apparatus according to claim 6, wherein the control pressing force applying arm includes a water passage in which cooling water flows and is cooled by the cooling water.

15. The spot welding apparatus according to claim 7, wherein the control pressing force applying arm includes a water passage in which cooling water flows and is cooled by the cooling water.

16. The spot welding apparatus according to claim 8, wherein the control pressing force applying arm includes a water passage in which cooling water flows and is cooled by the cooling water.

17. The spot welding apparatus according to claim 1, wherein the base end arm extends in a horizontal direction at an angle with respect to the movable shaft.

18. The spot welding apparatus according to claim 1, wherein the movable receiving unit of the control pressing force applying arm includes a water passage in which cooling water flows and is cooled by the cooling water.

19. The spot welding apparatus according to claim 1, wherein the base end arm of the control pressing force applying arm includes a water passage in which cooling water flows and is cooled by the cooling water.

20. The spot welding apparatus according to claim 2, wherein the control pressing force applying arm includes a water passage in which cooling water flows and is cooled by the cooling water,
wherein the movable receiving unit of the control pressing force applying arm includes a water passage in which cooling water flows and is cooled by the cooling water, and
wherein the base end arm of the control pressing force applying arm includes a water passage in which cooling water flows and is cooled by the cooling water.

* * * * *